2,237,442

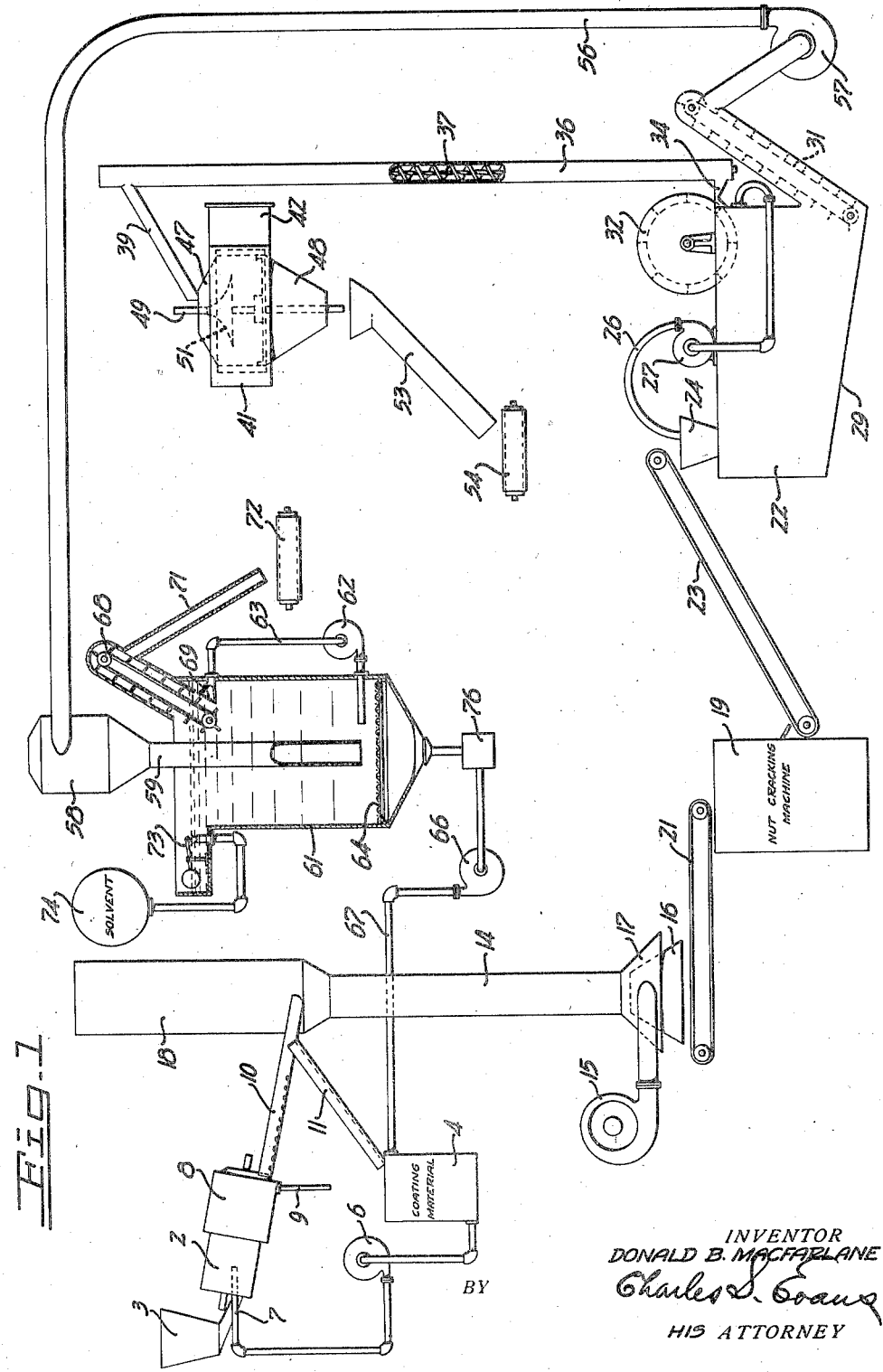

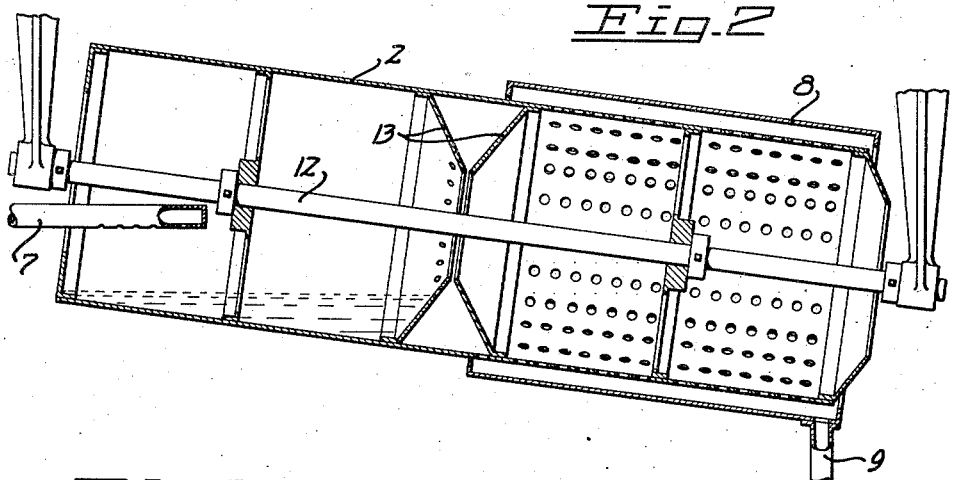
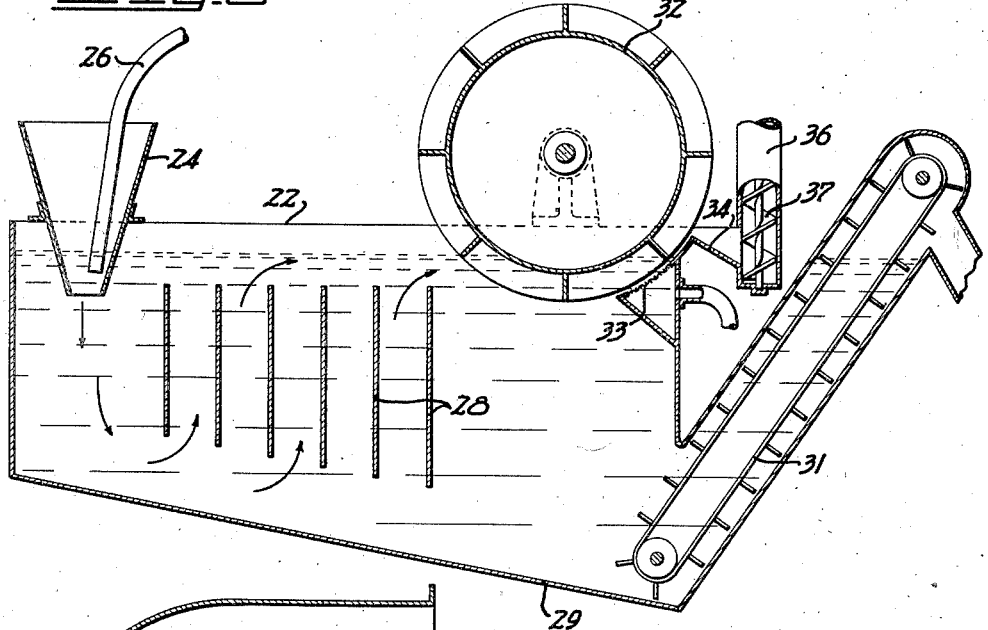
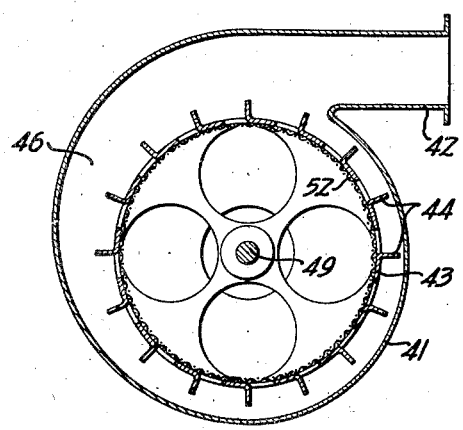
INVENTOR
DONALD B. MACFARLANE
BY *Charles S. Evans*
HIS ATTORNEY Patented Apr. 8, 1941

UNITED STATES PATENT OFFICE 2,237,442

METHOD OF SHELLING NUTS

Donald B. Macfarlane, Berkeley, Calif.

Application October 22, 1938, Serial No. 236,492

4 Claims. (Cl. 209—3)

My invention relates to the shelling of nuts, such as English walnuts; and the broad object of the invention is to provide a method for automatically separating the shells from the nut meats.

Another object of the invention is to provide a method embodying a step of treating the nuts before cracking to impart to the shells a characteristic different from that of the meats.

Another object is to provide a method relying upon means responsive to the differential characteristic for separating the shells from the meats.

Another object is to provide a method of the character described in which the nuts are treated by coating them with a material to alter the specific gravity of the shells relative to that of the meats, whereby the weight differential thus imparted may be utilized to effect separation, as by flotation.

A further object is to provide a method embodying the additional step of recovering the coating from the shells after separation.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a diagrammatic view, partly in section and partly in elevation, showing apparatus for carrying out a method embodying the improvements of my invention.

Figure 2 is an axial sectional view of the coating trommel; and

Figure 3 is a vertical sectional view of the flotation tank.

Figure 4 is a horizontal sectional view of the nut meat drier.

The shelling of nuts, such as English walnuts, is a difficult problem in commercial practice; the usual procedure being to crack the nuts in a suitable cracking machine and then separating the nut meats from the shells by hand. This hand picking of the meats involves a great deal of labor and is a time taking and expensive procedure when thousands of pounds of nuts are being handled. Hand picking is resorted to because there is no differential characteristic, such as a difference in weight, that can be relied upon to effect separation by mechanical devices, flotation or other separating means. The shells and meats of English walnuts have substantially the same specific gravity; some of the shell particles after cracking being heavier than the meats, and some of the meats being heavier than other shell particles. The size of the shell and meat particles is also sufficiently the same to render impossible mechanical separation relying upon such a difference.

I have solved the problem of shelling nuts, such as English walnuts, by treating the nuts before cracking to impart an artificial characteristic to the shells (such as increasing the weight of the shells), which characteristic is different from that of the meats and may be relied upon to effect an automatic separation of the shells and meats, as by flotation.

In terms of broad inclusion, the method of shelling nuts embodying my invention comprises the steps of treating the nuts to impart to the shells a characteristic different from that of the nut meats; cracking the treated nuts to release the meats; and then utilizing the differential characteristic thus imparted to separate the shells from the meats. In one form of my invention the nuts are treated by coating them with a material to alter the specific gravity of the shells relative to that of the nut meats, and subsequently the cracked shells are separated from the meats by flotation.

In greater detail, and referring particularly to the diagrammatic view in Figure 1 of the drawings, a nut shelling apparatus for practicing the method of my invention comprises a coating unit including an inclined trommel 2, into one end of which nuts to be shelled are introduced from a hopper 3. The nuts are coated with a suitable material from a tank 4 and introduced into the trommel by a pump 6 through a spray nozzle 7. In the apparatus being described, where liquid flotation is employed for separation, the coating material applied to the nut shells preferably comprises a paint including a dense material, such as metal, to add weight to the shells. I preferably use a copper-bronze powder with pyroxylin base vehicle and acetone thinner. It is understood however that other coating materials may be employed, depending upon the type of separating means employed and the sort of differentiating characteristic desired.

The excess coating on the nuts is caught by a casing 8 embracing a perforated end of trommel 2 and having a down spout 9 for draining the excess material back into supply tank 4. From trommel 2 the freshly coated nuts roll down a trough 10 having perforations along the underside to further drain excess fluid back in tank 4 by way of a drip trough 11. As shown in Figure 2, the trommel 2 is preferably an open ended drum mounted for rotation on a shaft 12, and is rotated by any suitable means, such as a belt drivably engaging the periphery of the drum. Apertured partition disks 13 are also provided in the drum to divide the upper end from the apertured lower portion. This partitioning also provides a reservoir for coating fluid in which the nuts may roll to supplement the coating action of spray nozzle 7. The coated nuts gradually work down over the partitions and out the lower end of the drum into trough 10.

Means are provided for drying the coated nuts. For this purpose a drying tower 14 is provided for receiving the nuts from trough 10. Warm air is forced into the lower end of the tower from a suitable source by a blower 15. The air is admitted from a restricted annular opening formed by a pair of cones 16 and 17; the upper end of the inner cone providing a central opening through which nuts in the tower may drop. As the nuts fall into the tower they are caught by the air stream and then slowly fall against the moving column of drying air; the latter being regulated to effect complete drying of the coating before the nuts reach the bottom of the tower. Upper portion 18 of the tower is preferably enlarged above the point where the nuts enter, so as to reduce the force of air draft to prevent the air from carrying the good nuts out the top of the tower. The draft may be adjusted however to blow the lighter nuts or culls out the top.

Means are provided for cracking the nuts. Any suitable nut cracking machine, indicated diagrammatically at 19, may be provided; and is arranged to receive nuts, as by a conveyor 21, from the bottom of the drying tower. The cracking machine is preferably of a type which breaks the shells into small pieces, so that the nut meats are completely released from the shells.

Means are also provided for separating the shells from the meats. For purposes of illustration I show a liquid flotation tank 22 into which the cracked shells and nut meats are dumped from a suitable conveyor 23 and separated by gravity. It is understood that other kinds of coating materials may be employed which will alter the relative responsiveness of the shell and meats to applied forces other than gravity, in order to effect the separation. For example, electrostatic or magnetic forces may be employed for separation, to which the coating material selected is sensitive. Also, other means relying upon a weight differential may be employed, such as air flotation, centrifuging or shaking on a jig. It is also understood that with separating devices depending upon weight differential, the nuts may be coated with a spongy material to make the shells lighter instead of heavier than the meats.

In a liquid flotation tank designed to separate the meats from heavier shell particles, as shown, the liquid used is preferably an ordinary salt solution of a density calculated to float the meats and allow the coated shells to sink to the bottom. The nuts are preferably introduced through a funnel 24 and are carried down well into the brine by a recirculating stream of fluid discharging into funnel 24 from a pipe 26. This pipe draws brine from the opposite end of the tank adjacent the surface, and a pump 27 is provided to effect circulation.

The nut particles are carried down with the discharging stream, and the lighter meats then float up toward the top, leaving the heavier shells at the bottom. Baffle plates 28 across the tank tend to break up the circulation in the tank and give time for the nut particles to be properly separated. See Figure 3. Bottom 29 of the tank is inclined so that the shells settling out move down to one end where they may be removed by suitable means, as by a chain ladder 31.

Nut meats floating to the top are gradually carried over to the discharge end by the circulation in the tank, and are removed by suitable means, as by a paddle wheel 32. The meats are prevented from being drawn into the circulating duct by a screen 33 adjacent the wheel. A chute 34 is arranged to catch the meats lifted out by the wheel and direct them to a suitable elevator 36, such as one having a screw 37, for conveying the meats to another unit of the apparatus.

Means are preferably provided for drying the nut meats after being removed from flotation tank 22. For this purpose a centrifugal drier and blower unit is arranged to receive the meats from a chute 39 leading from elevator 36. As shown in Figures 1 and 4, the unit comprises a casing 41 having a tangential outlet duct 42. A rotor is mounted within the casing and comprises an apertured cylindrical portion 43 having outwardly projecting fan blades 44 running in the blower chamber 46 of the casing. The rotor also has upper and lower conical sections 47 and 48, open at top and bottom for receiving and discharging the nut meats.

The entire rotating element is mounted on a shaft 49 driven by suitable means, not shown; and an outwardly flaring plate 51 is arranged on the shaft below the inlet to deflect the meats outwardly against the apertured walls of the rotor. A screen lining 52 prevents the small meat particles from passing through the apertured walls. As the wet meats pass downwardly through the whirling rotor the moisture is thrown off by centrifugal force, and the meats are further dried by the air draft drawn in through the ends of the rotor and passing outwardly through the screened openings by the blower action of blades 44. The moisture laden air is thus carried off by duct 42, and the dry meats fall into a chute 53 for delivery to a conveyor 54. The meats are preferably then graded for color by a suitable machine, not shown.

It is understood that if a type of separating means is employed that does not involve wetting the meats, the drying unit is not required and the separated meats may go directly to the color grading machine.

Since the shelling of nuts, such as English walnuts, is a large scale operation, involving the shelling of more than 100,000 pounds of walnuts per day, the salvaging of the coating material applied to the shells is desirable. To this end I take the shells from ladder 31 and carry them on an air stream forced through a duct 56 by a blower 57. This dries the shells and conveys them to a cyclone 58 where the shells are separated from the air stream and fall through a down spout 59 into a tank 61.

Tank 61 contains a solvent, such as acetone, for the paint, and the shells are washed in the solution by agitation created by a recirculating pump 62 for withdrawing fluid from the top of the tank through a duct 63 and discharging it at the bottom. The dissolved paint and metallic particles settle out through a screen 64 and are withdrawn from the bottom of the tank by a pump 66 and returned to coating tank 4 through a duct 67.

The washed shells are picked up by a chain ladder 68 adjacent the screened inlet 69 of the recirculating duct, to which the shells are drawn by the fluid circulation. The shells then drop through a chute 71 to a conveyor 72 upon which they are carried to any desirable point of disposal. Fluid level in tank 61 is preferably maintained by float valve 73 controlling inflow of solvent from a supply tank 74. If desired, a suitable trap 76 may be arranged in duct 67 to catch any salt water that might be carried over with the shells from the flotation tank.

Another saving may be effected in the apparatus by connecting the upper end of drying tower 18 with an absorption tower (not shown) associated with a still and condenser for collecting the evaporated solvent (acetone).

While I have described several pieces of equipment, such as the coating recovery means, in conjunction with my apparatus, it is understood that these may be employed or omitted as desired in a given installation, depending upon whether the recoveries made warrant the additional equipment. The broad combination of method steps remains the same, namely, the step embodying means (such as coating unit 2) for treating the nuts to impart to the shells a characteristic different from the nut meats (such as a differential in specific gravity); the step embodying means (cracking machine 19) for cracking the nuts to release the meats; and the step embodying means (such as flotation tank 22) responsive to the differential characteristic for separating the shells from the meats.

I claim:

1. The method of shelling nuts, which comprises applying to the nuts an adherent coating which alters the relative responsiveness of the shells and the meats to an applied force, cracking the coated nuts to release the meats, and then applying such force to the mixed meats and shells to effect the separation thereof by the utilization of the differential characteristics afforded by the presence of said coating on the shells.

2. The method of shelling nuts, which comprises fixing a metallic material upon the shells before cracking the nuts which alters the relative responsiveness of the shells and the meats to an applied force, cracking the nuts to release the meats from the metallized shells, and then applying such force to the mixed meats and shells to effect the separation thereof by the utilization of the differential characteristics afforded by the presence of said metallic material on the shells.

3. The method of shelling nuts, which comprises fixing a metallic material upon the shells before cracking the nuts which alters the relative responsiveness of the shells and the meats to an applied force, cracking the nuts to release the meats from the metallized shells, applying such force to the mixed meats and shells to effect the separation thereof by the utilization of the differential characteristics afforded by the presence of said metallic material on the shells, and then recovering the metallic deposit from the shells.

4. The method of shelling nuts, which comprises applying to the nuts an adherent coating which alters the relative responsiveness of the shells and the meats to an applied force, cracking the coated nuts to release the meats, applying such force to the mixed meats and shells to effect the separation thereof by the utilization of the differential characteristics afforded by the presence of said coating on the shells, and then dissolving the coating material to recover the same from the shells.

DONALD B. MACFARLANE.